United States Patent Office 3,719,172
Patented Mar. 6, 1973

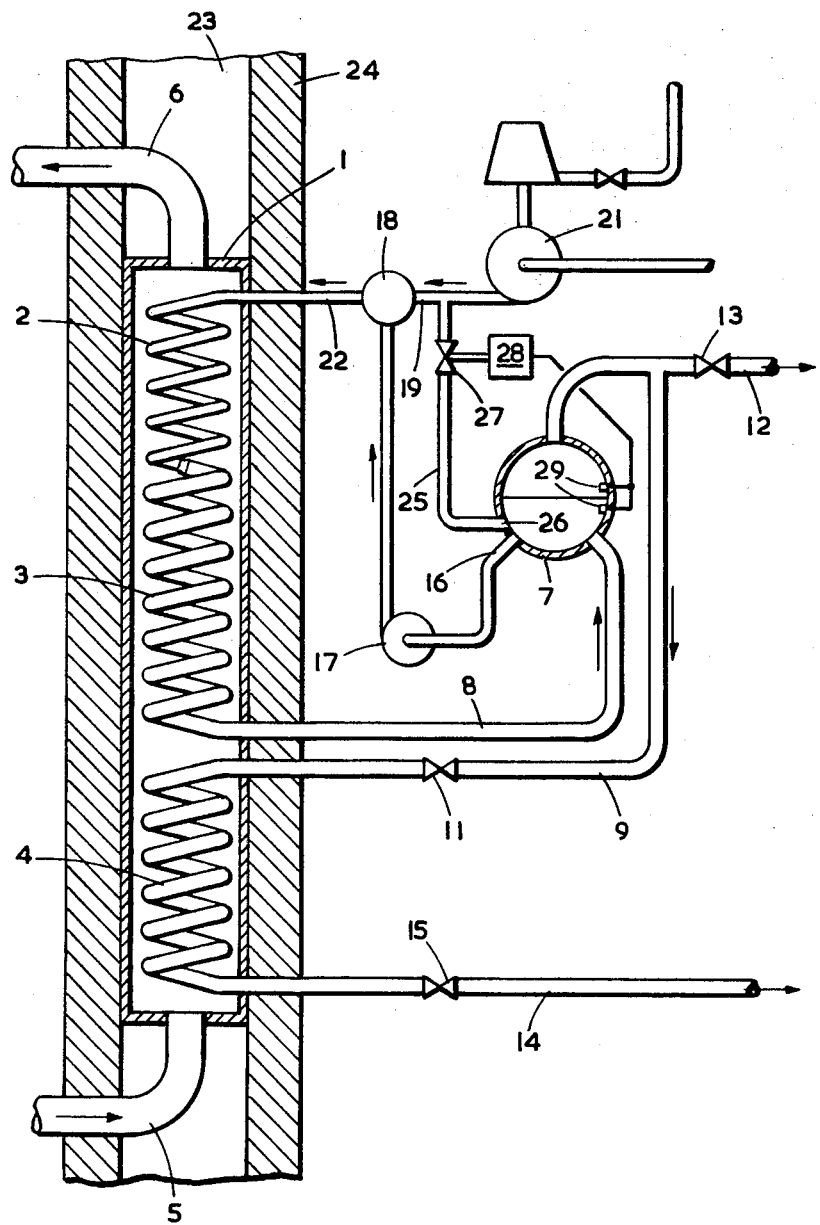

3,719,172
BOILER SYSTEMS OF THE WATER TUBE TYPE
Anthreas Nicholas Charcharos and Clifford Williamson, Whetstone, England, assignors to British Nuclear Design & Construction Limited, Whetstone, England
Filed Feb. 13, 1970, Ser. No. 11,056
Claims priority, application Great Britain, Feb. 14, 1969, 8,202/69
Int. Cl. F22b 1/18
U.S. Cl. 122—7 R
3 Claims

ABSTRACT OF THE DISCLOSURE

A boiler system includes economiser, evaporator and superheater water/steam tube sections 2, 3, 4 disposed within a casing 1, the economiser and evaporator tube sections 2, 3 being connected together in series inside the casing. The high temperature end of the evaporator section 3 is connected to a steam drum 7 disposed outside the casing, and the top of the steam drum is connected to the low temperature end of the superheater section 4. Provision is made for the recirculation of water from the steam drum to the low temperature end of the economiser section 2 by way of a recirculating pump 17. A further connection 25, controlled by a valve 27, may be provided between the steam drum 7 and a boiler feed line 19 for assisting the maintenance of the water level in the steam drum. For use with a nuclear reactor the casing may be adapted to be disposed in a pod 23 defined within the thickness of a wall 24 of the reactor pressure vessel.

---

This invention relates to boiler systems for producing steam.

In the past, boiler systems have been used with nuclear reactors in which reactor coolant flowed mainly upwardly through the reactor core and thus downwardly through a boiler casing which surrounded boiler water/steam tubes. To achieve contra-flow within the boiler casing so as to obtain efficient heat exchange the direction of water/steam flow through the boiler tubes was upward, this being in accord with natural convection and leading to stable flow conditions.

For reasons beyond the scope of the present discussion the current trend is for downward flow of reactor coolant through the reactor core and it is therefore convenient to provide for upward flow of reactor coolant through associated boiler systems. To achieve contra-flow in the boiler it is therefore necessary to provide downward water/steam flow.

One proposal for such a downward water flow system utilises a boiler of the "once-through" type in which economiser, evaporator and superheater tube sections are directly connected in series, the superheater being lowermost in the boiler casing. A severe problem however arises with such a "once-through" boiler in that natural convection, together with the buoyancy of steam produced in the boiler tubes, opposes the desired circulation and, particularly at reduced reactor heat outputs, the water/steam flow becomes unstable. A further disadvantage with this type of boiler is that, should the boiler feed water supply fail and have to be replaced from an emergency source of water, a time lag occurs during which the quantity of water available in the boiler tube sections is reduced with the consequent danger to the tube sections of overheating and thermal shock.

According to another proposal, the three principal boiler tube sections are separated from each other and have individual inlets and outlets which perforate the boiler casing. This proposal provides for forced circulation through the evaporator section, water being taken from and returned to a steam drum disposed outside the boiler casing. The steam drum also receives water from a boiler feed line, via the economiser section, and steam is fed from the top of the steam drum to the superheater section. Because, however, the inlets and outlets for the three principal tube sections are separate no fewer than six perforations of the boiler casing are required and where the boiler casing is disposed within a concrete nuclear reactor pressure vessel, or within a hole or pod defined within the thickness of a concrete pressure vessel wall, the provision of six such penetrations is a most unwelcome constructional feature.

A further disadvantage with this second proposal is that, should the boiler water feed line fail, there is no reserve of water within the boiler system itself for circulation through the economiser tube section which thus, during the time lag between the failure and the commencement of an emergency supply, may be subject to excessive temperature rise and thermal distortion. Also, if the associated nuclear reactor is simultaneously tripped from high power operation, the economiser tube section is unable, in the absence of supply from an emergency water source, to assist in the removal of heat from the reactor coolant.

According to the present invention a boiler system includes:

a boiler casing;
economiser, evaporator and superheater water/steam tube sections disposed within the casing, the economiser and evaporator tube sections being connected end to end within the casing;
a steam drum disposed outside the casing and arranged to receive steam/water from the evaporator section and to release steam to the superheater section; and
a mixing device also disposed outside the casing and arranged to receive water from the steam drum via a recirculating pump and from a boiler feed line, and to feed the mixed water to the economiser and evaporator sections for circulation therethrough.

Preferably a further connection is provided for feeding water directly from the boiler feed line to the steam drum, the further connection including valve means arranged to be controlled in dependence upon water level in the steam drum, whereby to assist in maintaining the said water level between preselected upper and lower limits.

A boiler system in accordance with the present invention is advantageous in that it necessitates only four perforations of the boiler casing and thus of the pressure vessel wall of a nuclear reaction in which the system may be installed. Such a system also contains a reserve of water which can be fed not only to the evaporator section in the event of failure of the boiler water feed line but also to the economiser section, thereby protecting the economiser from thermal distortion and, in the event of a trip from high reactor power, providing additional cooling surface area for the removal of heat from the reactor coolant without immediate resort to an emergency source of water. The system further provides a forced recirculation through both evaporator and economiser sections such that stability of water/steam flow is more easily secured, even at low reactor heat outputs.

In order that the invention may be readily understood, a boiler system in accordance therewith and forming part of a high temperature nuclear reactor in which the coolant gas flow through the reactor core is downward, will now be described, by way of example, with reference to the accompanying drawing.

The figure is a diagrammatic view of the boiler system and the relevant part of the reactor.

Referring to the drawing, the system comprises an elongated casing 1 which is suitable for insertion in a vertical hole or pod 23 formed within the thickness of the wall of the nuclear reactor pressure vessel 24, said casing housing economiser, evaporator and superheater tube sections 2, 3 and 4 respectively, which are arranged end to end in a vertical array. The economiser and evaporator sections 2 and 3 are directly connected together and are sited above the superheater section which is separate from the sections 2 and 3. Hot coolant gas emerging from the bottom end of the reactor core is fed into the casing 1 via a line 5 and is returned to the top end of the reactor core via said casing and a line 6. The outlet end of the evaporator section 3 is connected to a steam drum 7 outside the pressure vessel via a line 8, and a further line 9 connects the steam drum to the inlet end of the superheater section 4 via a valve 11. A bypass dump line 12 is provided in the line 9, the line 12 having a valve 13 included therein. The steam drum 7 is sited at a suitable height relative to the other parts of the system, the height being dictated by considerations of water/steam flow and stability. The outlet from the superheater section is fed via a line 14 and valve 15 to a steam turbine (not shown) associated with the nuclear reactor plant. Water collected in the steam drum 7 is fed via a line 16 and a recirculating pump 17 to a mixing device in the form of a mixing vessel 18 also situated outside the pressure vessel wall. The output from the pump 17 is variable over a wide range, to suit the operating conditions. The mixing vessel 18 via a line 19 also receives water via a boiler feed pump 21 from a boiler feed line associated with the condenser and feed heating plant (not shown) of the steam turbine. The mixed water from the vessel 18 is then fed via a line 22 to the inlet of the economiser section 2.

A further connection 25 is provided between the line 19 and a water injector 26 associated with the lower half of the steam drum 7. The connection 25 is provided with a valve 27 controlled by control means 28 which are associated with level sensors 29 responsive to water level in the steam drum.

In operation, feed water is fed to the mixing vessel 18 by the boiler feed pump 21 where it combines with water supplied from the steam drum 7 by the recirculating pump 17 and it is expected that the proportions of flow at full load would be 100% and about 10% of feed flow respectively. This combined water flow passes through the economiser section 2 to the evaporator section 3, where it would be heated to a steam dryness of about 0.91. The mixture then passes via the line 8 to the steam drum 7 where the steam and water are separated, and dry saturated steam is then fed from the drum via the line 9 to the superheater section 4 to be heated to the required degree of superheat before passing to a steam turbine. At part load the recirculation rate through that part of the system comprising the economiser and evaporator sections 2, 3, and the steam drum 7 would be varied by adjustment of the output from the recirculating pump 17 so as to maintain a stable water/steam flow through the boiler tube sections.

During start-up and shutdown the superheater section 4 can be isolated and steam dumped to a steam turbine condenser via the line 12. During these operations water recirculated through the economiser and evaporator sections 2 and 3 from the steam drum 7 is maintained at a suitable flowrate to ensure stable operation. Additional control of water level in the steam drum 7 is exercised by operation of the valve 27 disposed in the further connection 25, the valve controlling water flow through the connection 25 so as to maintain the water level between preselected upper and lower limits defined by the level sensors 29. Also, there is sufficient reserve of water in the steam drum 7 and the economiser and evaporator sections to accommodate the changeover of feed water from main feed pump to emergency feed pump. Boiler deposition problems are eased by the fact that the drum 7 is interposed between the evaporator section 3 and the superheat section 4, any austenitic stainless steel portions of the superheater section thus being afforded a degree of protection against harmful salts such as chlorides.

It is possible that future high temperature reactors will operate on a steam reheat cycle, thus eliminating the conventional reheater from the gas circuit. The limited circulation boiler system described above would require no greater a number of pressure vessel penetration than a gas reheat boiler, since a separate economiser tube section 2 is avoided by the use of the external mixing vessel 18.

We claim:
1. A boiler system including:
a casing;
economiser, evaporator and superheater water and steam tube sections disposed respectively within the casing;
a steam drum having an inlet and an outlet and being disposed outside the casing, the outlet being connected to the low temperature end of the superheater section for releasing steam thereto, and the inlet being connected to the high temperature end of the evaporator section for receiving water and steam therefrom; and
a boiler water feed line for supplying water to the low temperature end of the economiser section, the direction of water and steam flow during operation of the boiler system being downward;
wherein the improvement comprises connecting the high temperature end of the economiser section to the low temperature end of the evaporator section, inside the casing, and in providing:
a further outlet from the steam drum;
a recirculating pump; and
a mixing device having an outlet and two inlets, the device outlet being connected to the low temperature end of the economiser section, one of the device inlets being connected to the boiler water feed line, and the other device inlet being connected, via the recirculating pump, to the said further outlet from the steam drum for receiving recirculated water therefrom so as to maintain a good flow of water and steam through the economiser and evaporator sections at all times irrespective of any reduction of flow through the superheater section.

2. A boiler system according to claim 1, wherein a further connection is provided for feeding water directly from the boiler feed line to the steam drum, the further connection including valve means arranged to be controlled in dependence upon water level in the steam drum, whereby to assist in maintaining the said water level between pre-selected upper and lower limits.

3. A boiler system according to claim 1, for use with a nuclear reactor, wherein a pod is defined within the thickness of the reactor pressure vessel wall, and the said casing is adapted to be disposed in the pod, the said connections to and from the said tube sections passing through four perforations defined in the said wall.

References Cited
UNITED STATES PATENTS

| | | | |
|---|---|---|---|
| 2,170,345 | 8/1939 | Bailey | 122—406 X |
| 3,038,453 | 6/1962 | Armacost | 122—406 X |
| 3,115,870 | 12/1963 | Huet | 122—32 |
| 3,177,659 | 4/1965 | Berman | 122—32 X |
| 2,952,602 | 9/1960 | Wootton | 122—32 X |

KENNETH W. SPRAGUE, Primary Examiner

U.S. Cl. X.R.

122—32, 406 R